US010848964B2

(12) United States Patent
Yoon

(10) Patent No.: US 10,848,964 B2
(45) Date of Patent: Nov. 24, 2020

(54) METHOD AND APPARATUS FOR PAIRING CLIENT DEVICE AND ACCESS POINT IN WIRELESS LAN

(71) Applicant: KT Corporation, Seongnam-si (KR)

(72) Inventor: Byung Wan Yoon, Seoul (KR)

(73) Assignee: KT Corporation, Seongnam-si (KR)

( * ) Notice: Subject to any disclaimer, the term of this patent is extended or adjusted under 35 U.S.C. 154(b) by 64 days.

(21) Appl. No.: 16/306,229

(22) PCT Filed: May 26, 2017

(86) PCT No.: PCT/KR2017/005550
§ 371 (c)(1),
(2) Date: Nov. 30, 2018

(87) PCT Pub. No.: WO2017/209461
PCT Pub. Date: Dec. 7, 2017

(65) Prior Publication Data
US 2019/0306702 A1  Oct. 3, 2019

(30) Foreign Application Priority Data

Jun. 3, 2016 (KR) ..................... 10-2016-0069422
Aug. 16, 2016 (KR) ..................... 10-2016-0103413

(51) Int. Cl.
*H04W 12/00* (2009.01)
*H04W 12/06* (2009.01)
(Continued)

(52) U.S. Cl.
CPC ......... *H04W 12/003* (2019.01); *H04W 12/06* (2013.01); *H04W 48/16* (2013.01); *H04W 84/12* (2013.01); *H04W 92/10* (2013.01)

(58) Field of Classification Search
CPC ... H04W 12/003; H04W 12/06; H04W 48/16; H04W 84/12; H04W 92/10
See application file for complete search history.

(56) References Cited

U.S. PATENT DOCUMENTS

2008/0316982 A1   12/2008   Murty et al.
2011/0126271 A1    5/2011   Kim et al.
(Continued)

FOREIGN PATENT DOCUMENTS

EP         2 849 499 A1    3/2015
KR    10-2014-0058336 A    5/2014

OTHER PUBLICATIONS

WiFi Alliance, "Wi-Fi Protected Setup Specification version 1.0h", Dec. 2006, pp. 1-110.
(Continued)

*Primary Examiner* — Melvin C Marcelo
(74) *Attorney, Agent, or Firm* — Sughrue Mion, PLLC

(57) ABSTRACT

The disclosure relates to a wireless LAN and, more specifically, to a method and device for pairing a client device and an access point. According to one aspect of the invention, there is provided a pairing method executed at a client device side so as to be paired with an access point. The pairing method includes: transmitting a first probe request including probe request type information to the access point; receiving a first probe response from the access point; and performing an authentication procedure in conjunction with the access point on the basis of the first probe response.

16 Claims, 11 Drawing Sheets

(51) Int. Cl.
  *H04W 48/16* (2009.01)
  *H04W 92/10* (2009.01)
  *H04W 84/12* (2009.01)

(56) References Cited

U.S. PATENT DOCUMENTS

2016/0080889 A1   3/2016   Viswanathan et al.
2017/0272951 A1*  9/2017   Howard ................ G06F 21/606

OTHER PUBLICATIONS

International Search Report of PCT/KR2017/005550 dated Aug. 29, 2017 [PCT/ISA/210].

* cited by examiner

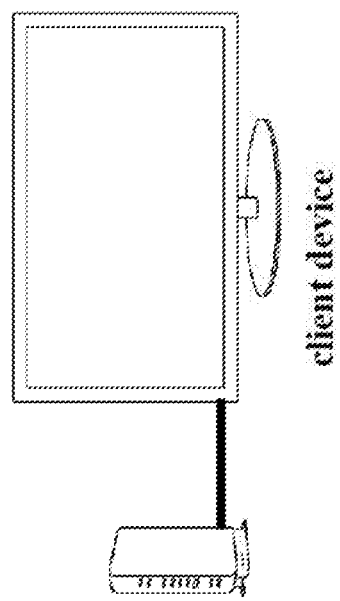
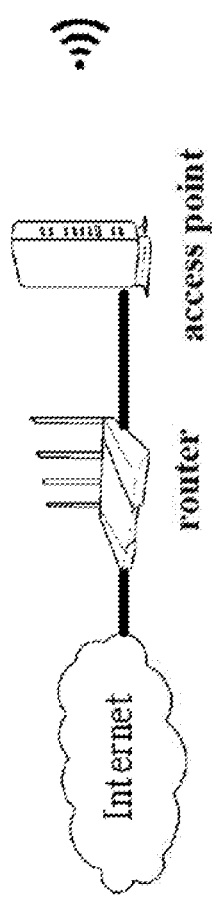
FIG. 1

| Order | Information |
|-------|-------------|
| 1 | SSID |
| 2 | Supported rates |
| 3 | Request information |
| 4 | Extended Supported Rates |
| ... | ... |
| Last | Vendor Specific |

FIG. 5

| KT flag | condition | meaning |
|---|---|---|
| 01 | - use for probe request.<br>- when an identified access point is not an access point that has been already recognized but is an access point in an active PBC mode (second type probe request) | - indicate a probe request from a specific vendor<br>- trigger a push button event (B$_R$) of a registrar<br>- set a monitor time of a registrar to a minimum value |
| 02 | - use for probe request.<br>- when an identified access point that has been already recognized (first type probe request) | - indicate a probe request from a specific vendor<br>- request immediate transmission of PBC information |
| 03 | - use as a probe response to a second type probe request<br>- when Selected Register = True (first type probe response) | - make a request of immediate transmission of a first type probe request to an enrollee |
| 04 | - use as a probe response to a second type probe request<br>- when Selected Register = False (second type probe response) | - make a request of retransmission in Tv after transmitting a first type probe request to an enrollee |

FIG. 6

METHOD AND APPARATUS FOR PAIRING CLIENT DEVICE AND ACCESS POINT IN WIRELESS LAN

TECHNICAL FIELD

The present invention relates to a wireless LAN and, more specifically, to a method and device for pairing a client device and an access point.

BACKGROUND ART

With development of wireless communications technology, wireless communication devices and systems are increasingly used.

The wireless communications systems include a Wireless Local Area Network (WLAN) system and a Wi-Fi system. In a Wi-Fi system, Wi-Fi client devices employing Wi-Fi technology connect to an access point over a Wi-Fi network for transmission and reception of data.

Connection of a Wi-Fi client device to an access point in a Wi-Fi system involves Wi-Fi Protected Setup (WPS) technology (also called Wi-Fi Simple Configuration (WSC)). WPS is technology to easily initiate a secured Wi-Fi connection.

For transmission and reception of data between an access point and a client device, the access point and the client device need to be paired. The paring process refers to a process in which an access point and a client device simultaneously locate their counterparts. The WPS technology supports a Personal Identification Number (PIN) input scheme, a Push Button Configuration (PBS) scheme, a Near Field Communication (NFC) scheme, etc.

In recent years, the use of Wi-Fi systems and Wi-Fi client devices has proliferated. With this trend, a technique for ever-more efficient pairing between access points and client devices is required.

DISCLOSURE

Technical Problem

The present invention is an improvement of a PBC scheme pairing method among various paring methods supported by WPS technology. The present invention provides a pairing method executed in a client device and provides a client device for executing the method.

The present invention is an improvement of PBC scheme pairing among various paring methods supported by WPS technology. The present invention provides a pairing method executed in an access point and provides an access point for executing the method.

The technical problems to be solved by the present invention are not limited to the ones mentioned above, and other technical problems which are not mentioned above can be clearly understood by those skilled in the art from the following description.

Technical Solution

According to one aspect of the invention, there is provided a pairing method executed by a client device so as to be paired with an access point. The pairing method includes: transmitting a first probe request including probe request type information to the access point; receiving a first probe response from the access point; and performing an authentication procedure in conjunction with the access point in response to the first probe response.

According to another aspect of the invention, there is provided a pairing method executed by an access point so s to be paired with a client device. The pairing method includes receiving a first probe request including probe request type information from the client device; transmitting a first probe response to the client device; and performing an authentication process in conjunction with the client device.

The briefly summarized features of the invention are merely exemplary aspects of the invention to be described below, and are not intended to limit the scope of the invention.

Advantageous Effects

According to the present invention, an efficient, flexible pairing method and device improved compared to a conventional PBC scheme pairing method can be provided.

The effects and advantages that can be achieved by the present invention are not limited to the ones mentioned above, and other effects and advantages which are not mentioned above but can be achieved by the present invention can be clearly understood by those skilled in the art from the following description.

DESCRIPTION OF DRAWINGS

The accompanying drawings herein are intended to aid understanding of the present invention, to represent various embodiments of the present invention, and to illustrate the principles of the invention in conjunction with a detailed description described below, in which:

FIG. 1 is a conceptual diagram illustrating a data communications system in which an access point and a client device are connected over a wireless channel for transmission and reception of data;

FIG. 5 is a table showing information recorded in a frame body of the probe request frame;

FIG. 6 is a table showing conditions in which either probe request type information or probe response type information is used and their meaning;

BEST MODE

Figure 2:
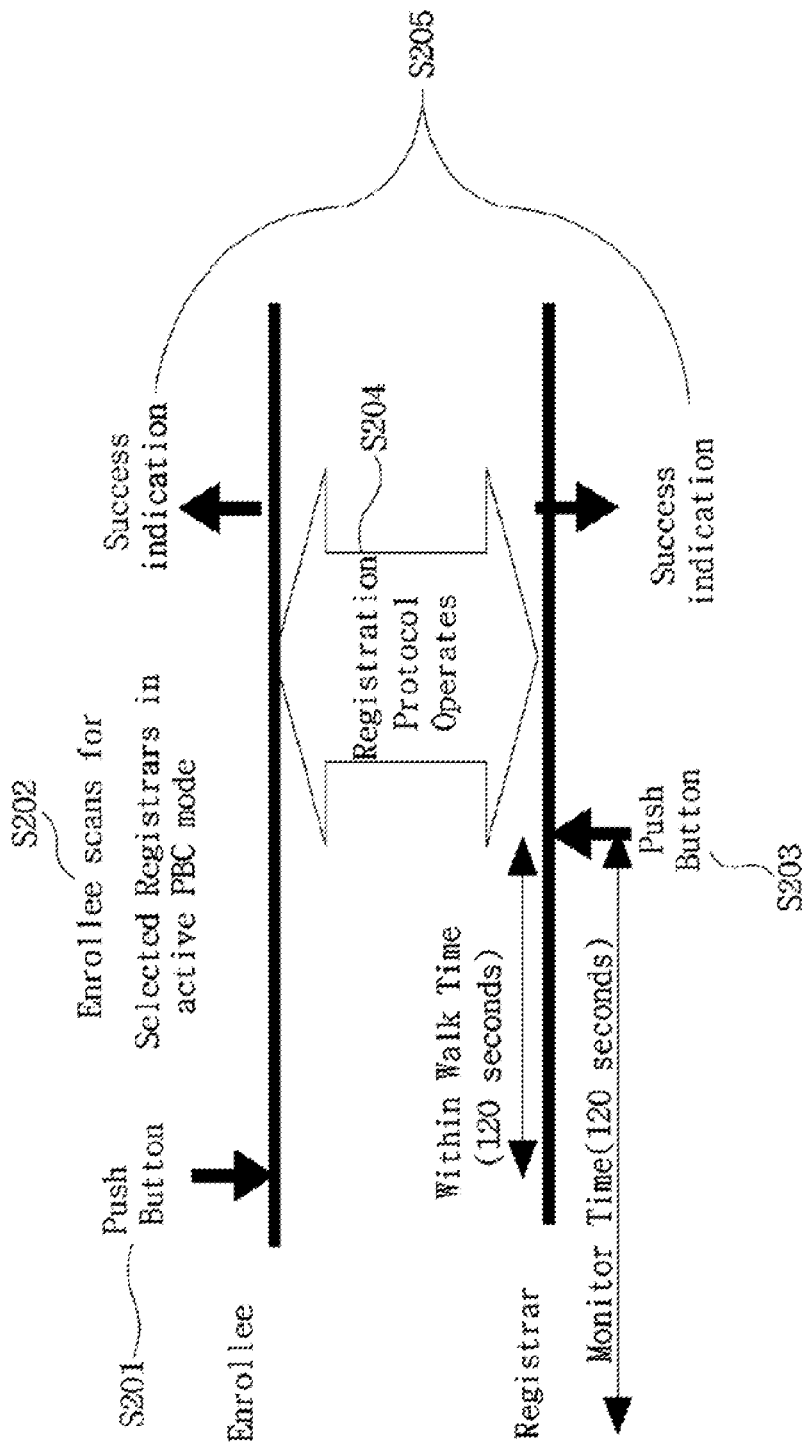
FIG. 2 is a view illustrating a PBC scheme pairing operation.

Hereinafter, the present invention will be described in detail with references to the present invention through an exemplary embodiment and the drawing. Reference should be made to the drawings, in which the same reference signs or numerals are used throughout the drawings to designate the same or similar components. Further, in describing exemplary embodiments of the present invention, well-known functions or constructions will not be described in detail since they may unnecessarily obscure the understanding of the present invention.

FIG. 1 is a conceptual diagram illustrating a data communications system in which an access point and a client device are connected over a wireless channel for transmission and reception of data;

An access point and a client device constitute an infrastructure basic service set (BSS) defined in a wireless LAN system. An access point manages client devices and functions to connect the client devices to an external network (for example, Internet).

Referring to FIG. 1, for example, a client device receives video information over a wireless channel via an access point and transmits the received signal to its own display device or a separate display device.

Examples of the client devices include a desktop computer, a laptop computer, a tablet PC, a wireless telephone, a mobile phone, a smartphone, a portable multimedia player (PMPO, a portable game machine, a set-top box, a digital picture player, and a digital video player.

In addition, the access point is a network stage device serving as a proxy intermediating connection between a client device and an external network. The access point configures a communication route to an external network such as the Internet, through a router (or a hub or a switching device).

For transmission and reception of data between an access point and a client device, the access point and the client device need to be paired. To support pairing between the access point and the client device, WPS technology uses a Personal Identification Number (PIN) input method, a Push Button Configuration (PBS) method, a Near Field Communication (NFC) method, etc.

Among them, the PIN input method or the NFC method are required to be equipped with a separate module for a PIN input device or NFC, resulting in an increase in equipment cost.

The PBC method is advantageous over the NFC method and the PIN input method in terms of equipment cost, but has a disadvantage attributable to an operation method thereof.

FIG. 2 is a view illustrating a PBC scheme pairing method.

In FIG. 2, an enrollee is a device that attempts to connect to an external network, and is used in the same sense as a client device in this specification. A registrar is a device that has the authority to accept or reject access to the external network. The registrar is implemented within an access point or is provided as a separate device. The access point functions as a proxy for the registrar and the enrollee.

Referring to FIG. 2, the PBC scheme pairing method will be described.

First, a push button of the enrollee to be connected to the external network is pressed by the user (S201). When a push button of the registrar is pressed within a work time after the push button of the enrollee is pressed (S203), the next connection procedure for pairing is performed. For example, the push buttons of the enrollee and the registrar may be physical buttons or virtual buttons. In addition, the work time may be set to a time length of 120 seconds.

In addition, the registrar can verify that there is only one enrollee in PBC mode during a monitor time which is set to a predetermined time length (e.g., 120 seconds). For example, when two or more push button events are detected until the monitor time of 120 seconds elapses after the push button of the registrar is pressed, the connection cannot be achieved and the process is treated as an error or failure.

The enrollee scans a selected registrar which is in an active PBC mode after the push button event occurs (S202). On the other hand, the registrar first ensures that only one enrollee attempts to have access thereto within the monitor time after the push button event occurs at the registrar side, and then performs an operation according to a registration protocol in conjunction with the enrollee (S204). When the operation according to the registration protocol is successfully performed, the result may be notified to both of the enrollee and the registrar (success indication) (S205).

As described above, the PBC scheme pairing operation requires that both of the push buttons of the enrollee and the registrar be pressed by the user within a predetermined time (for example, work time). However, there are problems that the enrollee and the registrar are physically far away in some cases. Furthermore, when the enrollee and the registrar are already installed devices, it is not easy to locate and press the push buttons. In other words, there are cases where it is difficult to press both of the push buttons of the enrollee and the registrar within the work time.

In addition, when two or more enrollee push button events are detected within the monitor time of 120 seconds, resulting in a pairing error or failure, since it is difficult for the user to recognize this status, the user is likely to press the push buttons several times, thereby resulting in error or failure being continued.

Figure 3:
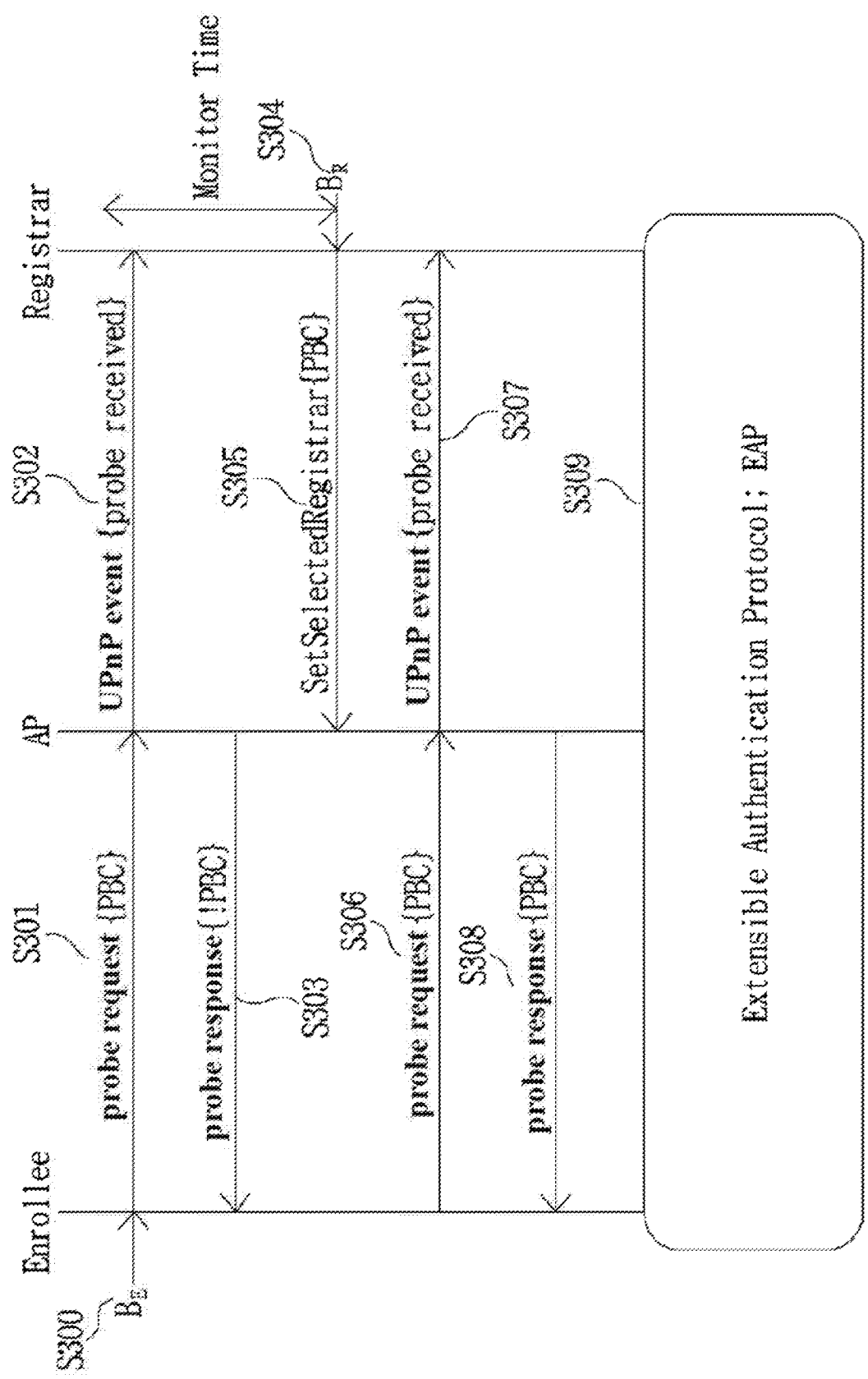
FIG. 3 is a diagram illustrating a registration protocol operation procedure based on a PBC scheme pairing operation.

FIG. 3 is a diagram illustrating a registration protocol operation procedure based on a PBC scheme pairing operation;

As illustrated in FIG. 3, when an enrollee push button event $B_E$ occurs (S300), the enrollee transmits a probe request to the access point (AP) (S301). The probe request may include PBC information of the enrollee. The PBC information of the enrollee includes, for example, information such as a device password ID. Additionally, although not shown in FIG. 3, the probe request transmitted by the enrollee to the access point may further include other information such as a WSC information element (IE). The WSC IE includes information indicating, for example, a maker, a model name, a model number, a serial number, a device name, a device type, and a supportable setting method (for example, PBC method).

The access point generates a Universal Plug and Play (UPnP) event for the receipt of the probe request from the enrollee and transmits it to the registrar (S302). In addition, the access point may transmit a probe response not including the PBC information of the selected registrar to the enrollee (S303), to reject the probe request of the enrollee in Step S301. For example, the access point may transmit a probe response not including the PBC information when receiving the first probe request from the enrollee to report the registrar of the occurrence of the UPnP event and to allow for a time taken for the registrar to perform subsequent operations. Although not shown in FIG. 3, the probe response transmitted by the access point to the enrollee is likely to include information such as a WSC IE.

When a push button event $B_R$ of the registrar occurs within a predetermined work time (for example, 120 seconds) from the occurrence of the push button event $B_E$ of the enrollee (S304), it is checked whether there have been PBC requests from two or more enrollees within a predetermined monitor time (for example, 120 seconds) after the push button event $B_R$ of the registrar occurs. When it is confirmed that there have been two or more requests, the process is treated as an error or failure. When not, the registrar transmits SetSelectedRegistrar that contains its own PBC information to the access point (S305).

After the lapse of a certain period of time, the enrollee transmits a probe request to the access point again (S306). The probe request includes PBC information and optionally additional information such as a WSC IE and the like.

The access point generates an UPnP event to indicate reception of the probe request from the enrollee and transmits it to the registrar (S307). In addition, the access point transmits a probe response containing PBC information of the registrar to the enrollee (S308). The probe response includes PBC information and optionally additional information such as a WSC IE and the like.

Thereafter, the enrollee, the access point, and the registrar perform an extensible authentication protocol (EAP) procedure (S309).

Figure 4:
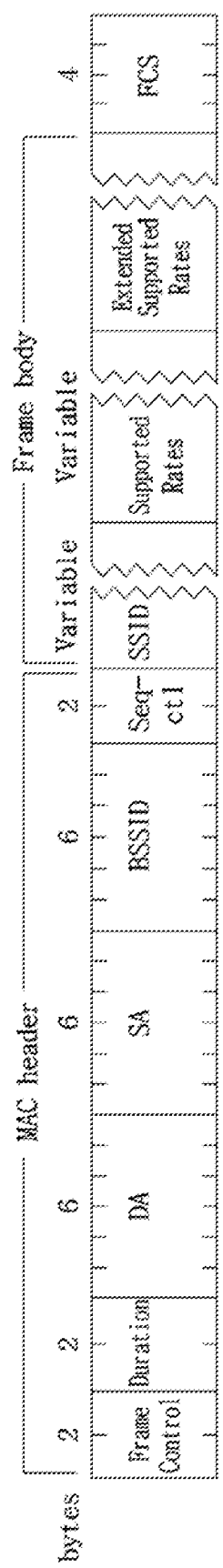
FIG. 4 is a diagram illustrating the structure of a probe request frame used in a PBC scheme pairing method.

FIG. 4 is a diagram illustrating the structure of a probe request frame used for PBC scheme pairing, and FIG. 5 is a table showing information recorded in a frame body of a probe request frame.

As shown in FIG. 4, the probe request frame includes a Medium Access Control (MAC) header and a frame body. The MAC header includes a 2-byte frame control field, a 2-byte duration field, a 6-byte destination address (DA) field, a 6-byte source address (SA) field, a 6-byte size basic service set ID (BSSID) field, a 2-byte sequence control field, and the like. A specific structure of the frame body included in the structure of the probe request frame of FIG. 4 will be described with reference to FIG. 5. The probe request frame may further include a frame check sequence (FCS) field having a 4-byte size.

As shown in FIG. 5, the frame body of the probe request frame includes a service set ID (SSID), supported rates, request information, extended supported rates, and a vendor specific field. Wherein the vendor specific field is a field that can be freely defined and used by a vendor to record any desired information.

Here, according to embodiments of the present invention described below, the probe request type information may be further included in the probe request frame. For example, in the present invention, probe request type information indicating the type of a probe request may be recorded in the vendor specific field. However, the scope of the present invention is not limited thereto, and the probe request type information used in embodiments of the present invention can be recorded in any other field than the vendor specific field within the probe request frame.

On the other hand, similarly to the probe request frame, the probe response frame may also include a MAC header, a frame body, and an FCS field. According to embodiments of the present invention, probe response type information may be further included in the probe response frame. For example, similarly to the probe request frame, the probe response frame includes a vendor specific field that allows a vendor to arbitrarily define and record any desired information. The probe response type information indicating the type of a probe response may be recorded in the vendor specific field. However, the scope of the present invention is not limited thereto, and the probe response type information used in embodiments of the present invention can be recorded in any other field than the vendor specific field within the probe respond frame.

FIG. 6 is a view illustrating probe request type information and probe response type information according to an embodiment of the present invention. In the example of FIG. 6, conditions in which the value of the probe request type information and the value of the probe response type information are set and the meaning thereof are shown.

In the following description, a field called a KT flag is defined as an example of the probe request type information and the probe response type information, but the scope of the present invention is not limited to the name or size of such a field. In the following description, the values 01, 02, 03, and 04 of the KT flag corresponding to the probe request type information or the probe response type information are used only for illustrative purposes, and the scope of the present invention is not limited thereto.

Also, in each of the probe request frame and the probe response frame, the KT flag may be defined as two-bit information. In this case, the 2-bit KT flag which is the probe request type information included in the probe request frame has a value of 01 (corresponding to a bit value of 00) or 02 (corresponding to a bit value of 01), in the example of FIG. 6. The 2-bit KT flag, which is the probe response type information included in the probe response frame, has a value of 03 (corresponding to a bit value of 10) or 04 (corresponding to a bit value of 11) in the example of FIG. 6.

Alternatively, in each of the probe request frame and the probe response frame, the KT flag information may be defined as 1-bit information. In this case, the 1-bit KT flag which is the probe request type information included in the probe request frame has a value of 01 (corresponding to a bit value of 0) or a value of 02 (corresponding to a bit value of 01) in the example of FIG. 6. The 1-bit KT flag, which is the probe response type information included in the probe response frame, may have a value of 03 (corresponding to a bit value of 0) or 04 (corresponding to a bit value of 1) in the example of FIG. 6.

The probe requests include a first type probe request having the KT flag set to a value of 02 and a second type probe request having the KT flag set to a value of 01.

The first type probe request is used when the identified access point is an access point that is already known to the enrollee. The enrollee identifies an access point that can be accessed through a channel scan, and can determine whether the identified access point is an access point with a connection history, on the basis of the basic service set identifier (BSSID) such as the MAC address of the identified access point. For example, the enrollee can identify the access point on the basis of the BSSID information included in a beacon frame or the like periodically broadcasted by the access point. The first type probe request indicates, for example, that the probe request is a probe request received from an enrollee of a specific vendor. In addition, the first type probe request also means that the access point is required to immediately transmit the PBC information of the selected registrar.

The second type probe request is used when an access point to be accessed is not known to an enrollee (that is, lack of connection history) but the access point is determined to be an access point that is in an active PBC mode. Here, the active PBC mode means that the access point is in a state of being able to be paired with another device using the PBC scheme. The second type probe request indicates, for example, that the probe request is a probe request received from an enrollee of a specific vendor. The second type probe request also means that the access point is required to trigger (e.g., generate a trigger signal by software) a push button event in the registrar or to shorten the registrar monitor time.

The probe responses include a probe response (not shown in FIG. 6) that does not include probe response type information, a first type probe response, and a second type probe response.

The probe response that does not include the probe response type information may be, for example, a probe response that is transmitted to the enrollee by the access point in Step S303 or S308 in FIG. 3.

When the access point receives the first type probe request from the enrollee, the access point checks the PBC information of the selected registrar and transmits the probe response including the PBC information of the selected registrar to the enrollee. In this case, the probe response may not include the probe response type information like the probe response transmitted from the access point to the enrollee in Step S308.

When the access point receives the second type probe request from the enrollee, it automatically generates a push-button event (BR) of the registrar by software, and then transmits the first type probe response having a KT flag set to a value of 03 or the second type probe response having a KT flag set to a value of 04 to the enrollee.

Upon receiving the second type probe request, the access point requests the registrar to transmit the PBC information of the selected registrar. When the registrar is unable to transmit the PBC information immediately for some reason, for example, because it is in the middle of performing a pairing operation with another enrollee, the registrar may transmit information TW of a time required until the registrar become available to transmit the information to the access point.

The first type probe response is a probe response transmitted to the enrollee by the access point that has received the second type probe request and is used when the access point receives the registrar's PBC (i.e., when Selected Registrar=TRUE). The first type probe response means that the enrollee is required to immediately transmit the first type probe request.

The second type probe response is a probe response that is transmitted to the enrollee by the access point that has received the second type probe request, and is used when the access point fails to receive the PBC of the registrar (i.e., when Selected Registrar=False). The second type probe response means that the enrollee is required to transmit the first type probe request in a predetermined time TW.

Figure 7:
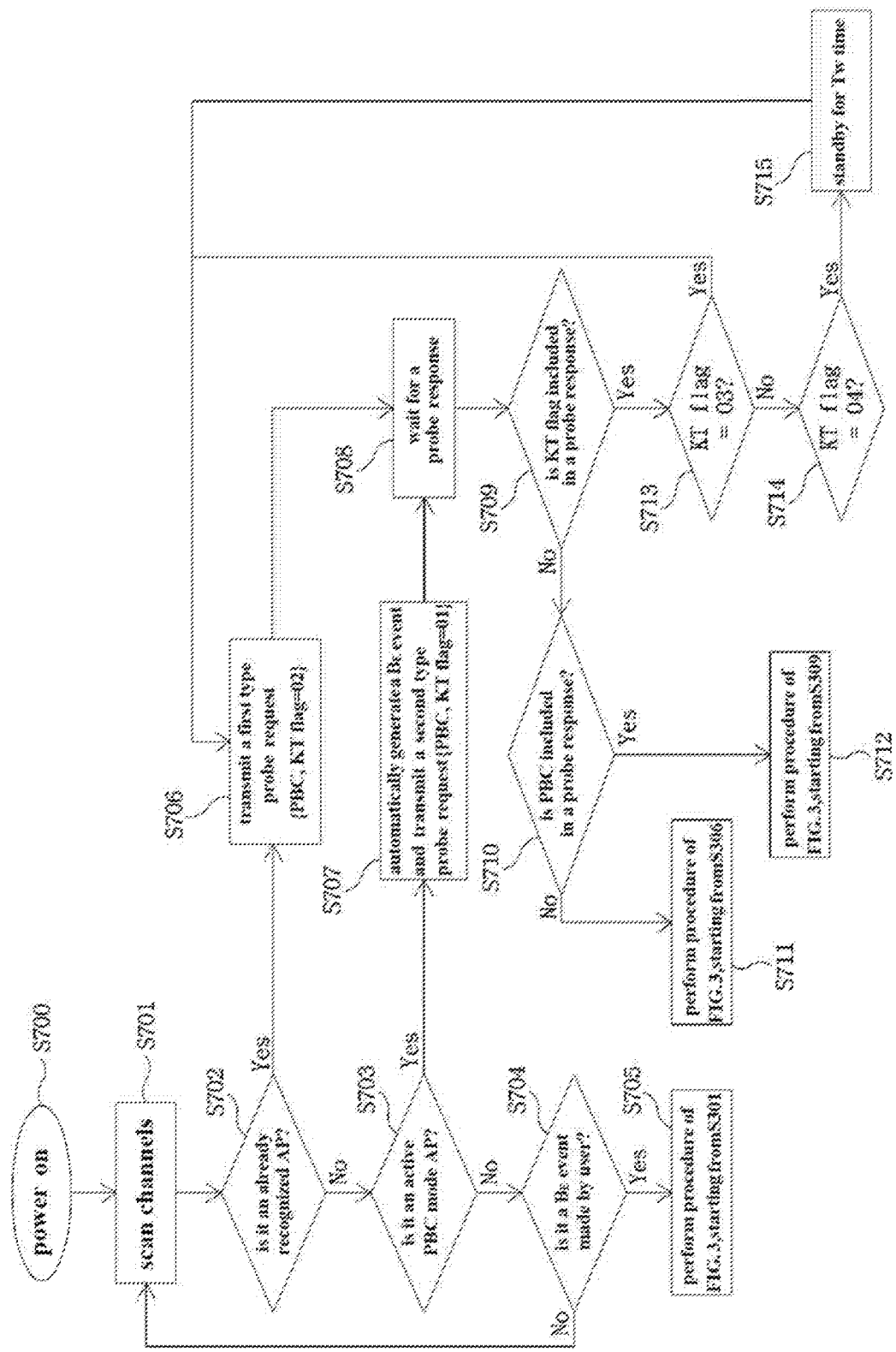
FIG. 7 is a flowchart illustrating a pairing method according to one embodiment of the present invention and, more specifically, a process performed in an enrollee.

FIG. 7 is a flowchart illustrating a pairing method according to one embodiment of the present invention and, more specifically, a pairing process performed by an enrollee.

When an enrollee is powered on (S700), the enrollee scans the channel to locate a connectable access point (S701). On the basis of the information such as the BSSID of the located connectable access point, the access point is checked for whether or not it has a connection history with respect to the enrollee, i.e., whether or not the access point is already known to the enrollee (S702). When it is determined in step S702 that the identified access point is an access point that has already been recognized by the enrollee, the KT flag is set to a value of 02 as the probe request type information, the setting of the KT flag is recorded in the vendor specific field of the probe request frame, and the first type probe request including PBC information is transmitted to the access point (S706).

After transmitting the first type probe request, the enrollee waits for a probe response from the access point (S708). When the enrollee receives the probe response from the access point, the enrollee determines whether the received probe response includes the KT flag (S709). When the received probe response does not include the KT flag, it is further determined whether the received probe response includes PBC information (S710). When the received probe response includes the PBC information, the PBC scheme pairing operation of FIG. 3 is performed. Specifically, the operation starts from S309 (i.e., the extensible authentication protocol procedure) (S712). When it is determined in Step S710 that the probe response does not include the PBC information, the PBC scheme pairing operation of FIG. 3 starts from S306 (S711).

When the access point identified through the channel scan is an access point that has already been recognized by the enrollee, since the extensible authentication protocol procedure can be performed immediately by transmitting the first type probe request and receiving the probe response including the PBC information of the registrar in response to the first type probe request, Steps S303 through S307 of FIG. 3 can be omitted. In addition, it is not necessary to wait for the user to directly press the push buttons of the enrollee and the registrar. Thus, the time taken for pairing is reduced, and the chance of the pairing failure attributable to the user's button pressing operation failure can be reduced. Therefore, the pairing can be efficiently performed.

Referring again to Step S702, when the identified access point is determined as not being an access point that has already been recognized by the enrollee, the enrollee determines whether the identified access point is in an active PBC mode (S703). When the identified access point is determined to be in the active PBC mode, the push button event $B_E$ of the enrollee is automatically generated by software, the KT flag is set to a value of 01, the setting of the KT flag is recorded in the vender specific field of the probe request frame, and the second type probe request including the PBC information of the enrollee is transmitted to the access point (S707).

After transmitting the second type probe request, the enrollee waits for a probe response from the access point (S708). When the enrollee receives the probe response from the access point, the enrollee determines whether the received probe response includes the KT flag (S709).

After the enrollee transmits a second type probe request, the enrollee can receive any one of the following responses from the access point: a probe response that does not include the KT flag; a first type probe response having the KT flag set to a value of 03; and a second type probe response having the KT flag set to a value of 04.

When the enrollee receives the probe response that does not include the KT flag (NO in Step S709) after transmitting the second type probe request, the enrollee further determines whether the received probe response includes PCC information (S710). When it is determined that the received probe response includes the PBC information, the PBC scheme pairing operation of FIG. 3 starts from Step S309 (S712). When it is determined that the received probe response does not include the PBC information, the PBC scheme pairing operation of FIG. 3 starts from S306 (S711).

When the enrollee receives the probe response that includes the KT flag (YES in Step S709) after transmitting the second type probe request, the enrollee further determines whether the KT flag has a value of 03 (S713). When it is determined in Step S713 that the KT flag is set to a value of 03, the enrollee sets the KT flag to a value of 02 as the probe request type information, records the KT flag setting in the vendor specific field of the probe request frame, and immediately transmits the first type probe request including the PBC information of the enrollee to the access point (S706).

In the subsequent step, since the access point is determined as being an access point that has already been recognized by the enrollee in Step S702, the processing, which is performed in the case where the KT flag is set to a value of 02 as the probe request type information and the first type probe request including the PBC information of the enrollee is transmitted to the access point, is performed.

As described above, when it is determined in Step S703 that the identified access point is in the active PBC mode, the push button event $B_E$ can be generated automatically by software, without direct intervention or manipulation of the user. Therefore, there is no need for the user to find and press the push button of the enrollee by himself or herself. In addition, when the enrollee receives the first type probe response from the access point in response to the second type probe request, since the enrollee immediately transmits the first type probe request to the access point, it is possible to minimize the time taken for the enrollee to retransmit the first type probe request.

Referring again to Step S713, the KT flag of the probe response that is sent to the enrollee from the access point as a reply to the second type probe request is not a value of 03, the enrollee determines whether the KT flag of the probe response received from the access point as the reply to the second type probe response is a value of 04 (S714).

In this embodiment, since the KT flag that can be included in the probe response has a value of either 03 or 04, it is determined that the KT flag has a value 04 in Step S714. However, as described above, the KT flag is not limited to having one of the two values, but may have one value selected from two or more values. In this case, an additional operation may be defined for a case where it is determined in Step S714 that the value of the KT flag is not 04. For example, even when the value of the KT flag is neither 03 nor 04, the KT flag can be used to determine whether the probe request or the probe response is transmitted by an enrollee or an access point of a specific vendor, on the basis of the presence or absence of the KT flag.

When it is determined in Step S714 that the probe response received from the access point in response to the second type probe request is a second type probe response having the KT flag set to a value of 04, the enrollee may wait until a waiting time TW elapses (S715) and then transmits the first type probe request having the KT flag set to a value of 02 to the access point (S706). The information on the waiting time Tw may be included in the second type probe response for transmission.

In the subsequent step, since the access point is determined as being an access point that has already been recognized by the enrollee in step S702, the same processing as in the case where the KT flag is set to 02 as the probe request type information and the first type probe request including the PBC information of the enrollee is transmitted to the access point is performed.

The information of the waiting time TW transmitted in a state of being included in the second type probe response is set in consideration of a time that is taken for the registrar to appropriately respond to a connection request of the enrollee according to the status of the registrar. For example, in a case where the registrar cannot immediately respond to a PBC request because it is in the middle of performing a pairing process with another enrollee, the time required for the registrar to process the PBC request or the like needs to be considered in setting the waiting time TW.

As such, when a registrar is in a state of not being able to respond immediately to a PBC request, the enrollee transmits a first type probe request in a predetermined waiting time TW. Therefore, it is not necessary for the enrollee to repeatedly transmit a probe request or it is possible to prevent a push button event $B_E$ from repeatedly occurring. By doing so, it is possible to control the occurrence of an error or failure situation due to an event that multiple requests are issued by multiple enrollees.

Referring again to Step S703, when it is determined that the identified access point is not in the active PBC mode, it is determined whether or not an enrollee push button event $B_E$ is generated by user intervention or manipulation (S704). When it is determined in Step S704 that the enrollee push button event occurs, the PBC scheme pairing operation of FIG. 3 starts from S301 (S705). When it is determined in Step S704 that the push button event of the enrollee does not occur, the enrollee performs the channel scan again (S701).

Figure 8:
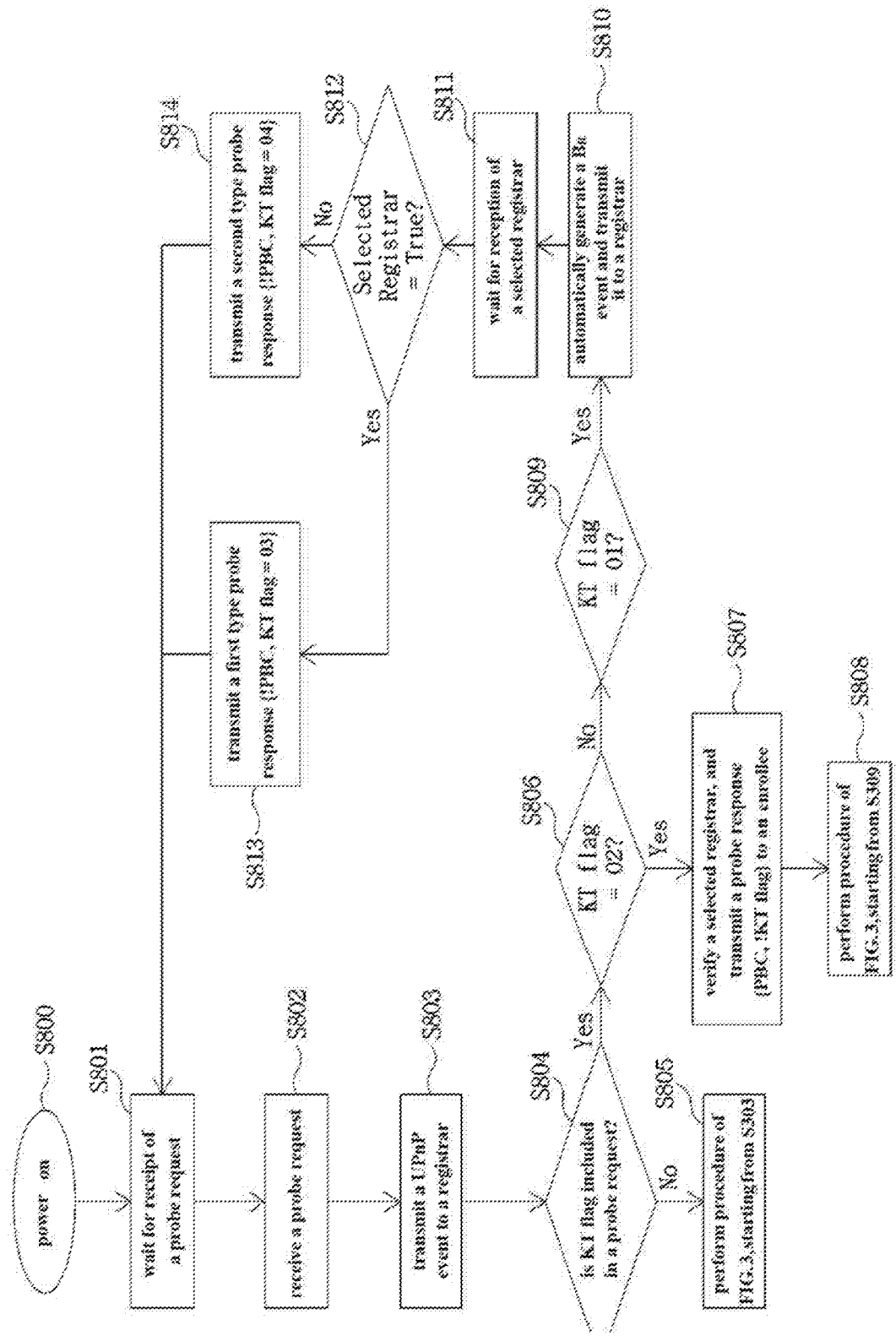
FIG. 8 is a flowchart illustrating a pairing method according to one embodiment of the present invention and, more specifically, a process performed in an access point.

FIG. 8 is a flowchart illustrating a pairing method according to one embodiment of the present invention and, more specifically, a process performed by an access point.

When an access point is powered on (S800), the access point enters a standby state in which the access point waits for reception of a probe request from an enrollee (S801). When the access point receives a probe request from the enrollee (S802), the access point generates a Universal Plug and Play (UPnP) event to indicate the reception of the probe request and transmits it to a registrar (S803). The access point checks whether a KT flag is included in a received probe request frame (S804). When the KT flag is not included, the access point determines that the enrollee is not a specific vendor's enrollee and performs the pairing operation of FIG. 3, starting from S303. When it is determined in Step S804 that the received probe request frame includes the KT flag, the access point further determines whether the KT flag has a value of 02 (S806). That is, the access point checks whether the received probe request is a first type probe request.

When it is determined in Step S806 that the probe request received by the access point is the first type probe request having the KT flag set to a value of 02, the access point checks PBC information of a selected registrar and transmits a probe response including the PBC information of the selected registrar to the enrollee (S807). In Step S807, the probe response transmitted by the access point to the enrollee includes only the PBC information of the registrar and may not include the KT flag. Thereafter, the PBC scheme pairing operation of FIG. 3 is performed from Step S309 (i.e., extensible authentication protocol procedure) (S808).

In this way, when the access point receives the first type probe request having the KT flag set to a value of 02 from the enrollee, the PBC of the selected registrar is checked and the probe response including the PBC is transmitted to the enrollee. That is, since the extensible authentication protocol procedure can be performed immediately, Steps S303 through S307 of FIG. 3 can be omitted. In addition, it is not necessary to wait for the user to directly press the push buttons of the enrollee and the registrar. Therefore, the time required for pairing is shortened, and efficient pairing becomes possible.

Referring again to Step S806, when the KT flag of the received probe request does not have a value of 02, the access point determines whether the KT flag has a value of 01 (S809). In this embodiment, since the KT flag that can be included in the probe request has a value of either 01 or 02, it is determined that the KT flag has a value 01 in Step S809.

However, as described above, the KT flag is not limited to having one of the two values, but may have one value selected from two or more values. In this case, an additional operation may be defined for a case where it is determined in Step S714 that the value of the KT flag is not 01. For example, even when the value of the KT flag is neither 01 nor 02, the KT flag can be used to determine whether the probe request or the probe response is transmitted by an enrollee or an access point of a specific vendor, on the basis of the presence or absence of the KT flag.

In Step S809, when the probe request received from the enrollee is a second type probe request having the KT flag set to a value of 01, the access point automatically generates a push button event $B_R$ by software and transmits the push button event $B_R$ to the registrar (S810), and waits for the selected registrar to receive the push button event $B_R$ (S811). At this time, the access point receiving the second type probe request can control the registrar such that the monitor time of the registrar can be minimized. This is to provide control for faster priority pairing of a probe request from a specific vendor's enrollee. That is, by reducing the monitor time, which is typically set to about 120 seconds, to 60 seconds, it is possible to reduce the chance of pairing errors or failure.

In subsequent to Step S811, the access point determines whether the selected registrar received from the registrar is available (i.e., selected registrar=True) (S812). When the selected registrar is available, the access point transmits a first type probe response having the KT flag set to a value of 03 (Step S813). After transmitting the first type probe response to the enrollee, the access point enters again a standby state in which the access point waits for reception of a probe request (S801).

As described above in connection with the operation of the enrollee with reference to FIG. 7, the enrollee, upon receiving the first type probe response, immediately transmits the first type probe request to the access point. Accordingly, in the example of FIG. 8, the access point is in a standby state of waiting for reception of a probe request (S801) after transmitting the first type probe response (S813), receives the first type probe request having the KT flag set to a value of 02 (S802). As mentioned above, the access point receiving the first type probe request generates and transmits an UPnP event to the registrar (S803). Then, in accordance with the processing of the probe request having the KT flag set to a value of 02 (YES in S804 and S806), the PBC information of the selected registrar is checked and the probe response including the PBC information is transmitted to the enrollee (S807). Also, in this case, the probe response corresponding to the first type probe request may include only the PBC information of the registrar and may not include the KT flag. Thereafter, the PBC scheme pairing operation of FIG. 3 is performed from Step S309 (i.e., extensible authentication protocol procedure) (S808).

Thus, when the second type probe request is received, since the access point automatically generates a push button event $B_R$ of the registrar by software, it is not necessary for the user to manipulate the push button of the registrar by himself or herself. Also, in reply to the second type probe request, when the selected registrar is available (selected registrar=True), the access point may transmit the first type probe response having the KT flag set to a value of 03 to the enrollee, and the enrollee immediately transmits the first type probe request to the access point. Therefore, it is possible to shorten the time taken for the enrollee to retransmit the probe request. In addition, by recognizing that the request is a probe request from a specific vendor and minimizing the monitor time of the registrar, it is possible to quickly and with priority process the pairing of a specific vendor, and to minimize the pairing error or failure.

Referring again to Step S812, when the selected registrar received from the registrar is not available (i.e., selected registrar=False), the access point transmits a second type probe response having the KT flag set to a value of 04 (Step S814). In this case, the second type probe response may further include information of a waiting time TW. After transmitting the second type probe response to the enrollee, the access point enters again a standby state in which the access point waits for reception of a probe request (S801).

Here, the waiting time TW is information which is set in consideration of the time required for the registrar to respond appropriately to the request of the enrollee according to the status of the registrar. For example, when the registrar is currently in the middle of performing a paring process with another enrollee, the registrar cannot immediately respond to the request of the enrollee. In this case, the registrar needs to wait for a reply until completely processing the PBC request. Therefore, the waiting time TW needs to be set in consideration of this case or the like. In this case, the registrar transmits the waiting time and the selected registrar that is not available (the selected registrar=False) to the access point, and this is transmitted to the enrollee as information included in the second type probe information.

As described above in connection with the operation of the enrollee with reference to FIG. 7, the enrollee, upon receiving the second type probe response, transmits the first type probe request to the access point when the waiting time TW elapses. Accordingly, in the example of FIG. 8, the access point is in a standby state of waiting for reception of a probe request (S801) after transmitting the second type probe response (S814), receives the first type probe request having the KT flag set to a value of 02 (S802) when the predetermined waiting time elapses. As mentioned above, the access point receiving the first type probe request generates and transmits an UPnP event to the registrar (S803). Then, in accordance with the processing of the probe request having the KT flag set to a value of 02 (YES in S804 and S806), the PBC information of the selected registrar is checked and the probe response including the PBC information is transmitted to the enrollee (S807). Also, in this case, the probe response corresponding to the first type probe request may include only the PBC information of the registrar and may not include the KT flag. Thereafter, the PBC scheme pairing method of FIG. 3 is performed, starting from Step S309 (S808).

As such, when a registrar is in a state of not being able to respond immediately to a PBC request, the enrollee transmits a second type probe response which means that the first type probe request is to be transmitted in the predetermined waiting time TW. Therefore, it is not necessary for the enrollee to repeatedly transmit a probe request or it is possible to prevent a push button event $B_E$ from repeatedly occurring. By doing so, it is possible to control the occurrence of an error or failure situation due to an event that multiple requests are issued by respective enrollees during the monitor time.

Figure 9:
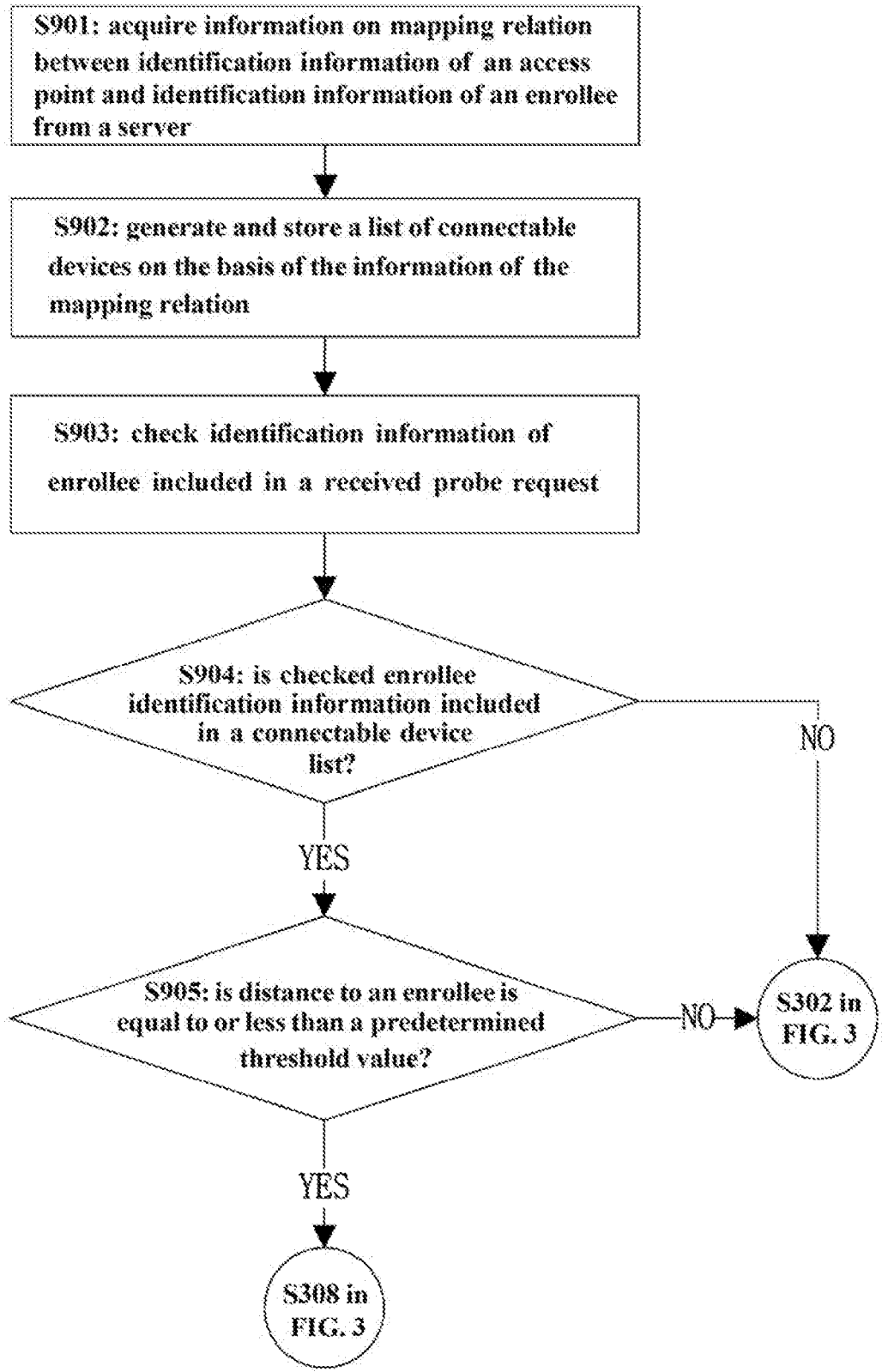
FIG. 9 is a flowchart illustrating a pairing method according to another embodiment of the present invention and, more specifically, a method performed in an access point.

FIG. 9 is a flowchart illustrating a pairing method according to another embodiment of the present invention and, more specifically, a method performed by an access point.

In the foregoing examples, an efficient pairing method using either or both of the probe request type information and the probe response type information have been presented.

As further or alternative example, the present invention provides an efficient pairing method based on the strength of a received signal (or on a distance between the access point and the enrollee), together with the identification information of the access point and the identification information of the enrollee (or client device).

For example, the access point acquires information on the mapping relation between the identification information of the access point and the identification information of the enrollee from an external server. The access point generates and stores a list of enrollees that are allowed to have access thereto, i.e., a connectable device list (for example, a white list), on the basis of the information on the mapping relation. On the basis of this connectable device list, the access point can determine whether the enrollee that has transmitted a probe request thereto is an enrollee that is allowed to have access thereto. Herein, the identification information of the access point may be the MAC address of the access point, and the identification information of the enrollee may be the MAC address of the enrollee. However, the identification information may not be limited to the MAC addresses but may be other unique information by which each access point and each enrollee are identifiable.

In addition, the access point may transmit a probe response or generate an UPnP event, depending on whether or not the enrollee that has transmitted the probe request is located at a short distance from the access point, even when the enrollee that has transmitted the probe request to the access point is included in the connectable device list. For example, when the enrollee that has transmitted the probe request is located at a short distance from the access point, the access point can directly transmit a probe response including the PBC to the enrollee (e.g., Step S308 of FIG. 3), and can proceed to the EAP procedure. That is, when the enrollee belonging to the connectable device list has sent the probe request at a short distance, a probe response is immediately transmitted to shorten the procedure. Alternatively, when the enrollee that has transmitted the probe request is relatively far from the access point, the access point may generate a UPnP event indicating the reception of the probe request and may forward the UPnP event to the registrar (e.g., Step S302 of FIG. 3). Herein, in order to determine the distance between the enrollee that has transmitted the probe request and the access point, the access point can use a Received Signal Strength Indicator (RSSI) of the probe request and a predetermined threshold value thereof. However, the scope of the invention is not limited thereto. Any other information (e.g., indoor location information, etc.) with which the distance between the access point and the enrollee can be determined may be used.

This additional example in which the connectable device list and the distance information are used may be used in combination with the example in which the probe request type information or the probe response type information (for example, KT flag information included in the probe request and/or the probe response) is used.

For example, the requirement of the inclusion within the connectable device list and the requirement of a short distance may have a higher priority than the requirement for the KT flag.

Specifically, when the KT flag is set to a value of 01 in the probe request, this case means that the access point has not been recognized by the enrollee. However, even in this case, if the enrollee is included in the connectable device list and is located at a short distance, the access point may immediately transmit the probe request including the PBC as with the case in which the access point has been recognized by the enrollee. That is, the access point can perform Step S807 and the subsequent steps of FIG. 8. When KT flag is set to a value of 01 in the probe request, this case means that the enrollee does not recognize the access point. In this case, if the enrollee is not included in the connectable device list or is located at a far distance, the access point performs Step S810 and the subsequent steps of FIG. 8. When KT flag is set to a value of 02 in the probe request, this case means that the enrollee recognizes the access point. In this case, if the enrollee is included in the connectable device list and is located at a short distance, the access point performs Step S807 and the subsequent steps of FIG. 8. When the flag is set to a value of 01 in the probe request, this case means that the enrollee recognizes the access point. However, in this case, if the enrollee is not included in the connectable device list or is located at a relatively far distance, the access point performs Step S810 and the subsequent steps of FIG. 8.

Alternatively, the value of the KT flag may have a higher priority than the requirement of the inclusion within the connectable device list and the requirement of a near distance.

Specifically, even though the enrollee is included in the connectable device list and is located at a short distance, if the KT flag is set to a value of 01 in the probe request, this means that the access point is not recognized by the enrollee, the access point performs Step S810 and the subsequent steps of FIG. 8. When the enrollee is included in the connectable device list and is located at a short distance and when the KT flag is set to a value of 02 in the probe request, since this case means that the access point has been already recognized by the enrollee, the access point performs Step S807 and the subsequent steps of FIG. 8. When the enrollee is not included in the connectable device list or is located at a long distance and when the KT flag is set to a value of 01 in the probe request, since this case means that the access point has not been recognized by the enrollee, the access point performs Step S810 and the subsequent steps of FIG. 8. When the enrollee is not included in the connectable device list or is located at a long distance and when the KT flag is set to a value of 02 in the probe request, since this case means that the access point has been already recognized by the enrollee, the access point performs Step S807 and the subsequent steps of FIG. 8.

Alternatively, the operation of the access point based on the connectable device list and the distance information may be applied only when the KT flag information is not included in the probe request received from the enrollee.

Alternatively, when the access point fails to acquire information on the mapping relation between the identification information of the access point and the identification information of the access point from the external server, the operation based on the connectable device list and the distance information described above is not applied. Instead of the operation, the operation example in which using the probe request type information or the probe response type information (e.g., KT flag information included in the probe request and/or the probe response) may be used.

Hereinafter, referring to FIG. 9, the operation of an access point will be described for a case where the KT flag information is not included in the probe request frame received from the enrollee. However, the scope of the invention is not limited thereto. The exemplary operation in which the probe request type information or the probe response type information (for example, the KT flag information included in the probe request and/or the probe response) may be used in combination with the exemplary operation in which the connectable device list and the distance information are used.

In step S910, the access point may acquire information on mapping relation between the identification information of the access point and the identification information of the enrollee from a server. Here, referring to FIG. 1, the server may be an external server that is connected with the access point over the Internet. The server may store identification information of access points (e.g., MAC addresses of the access points) and identification information of enrollees (e.g., MAC addresses of the enrollees), and also stores the mapping relation therebetween.

For example, the information on the mapping relation is defined as in Table 1.

TABLE 1

| AP MAC | AP IP | Client MAC |
| --- | --- | --- |
| A:A:A | 1.1.1.1 | B:B:B |
| C:C:C | 1.1.1.2 | |
| D:D:D | 2.1.1.1 | E:E:E |

As shown in Table 1, an enrollee (or client device) having a MAC address of E:E:E may be associated with an access point having a MAC address of D:D:D.

The mapping relationship shown in Table 1 is first defined by an operator, a network provider, or a service provider, stored in the server, and can be updated latter. For example, when the user of an enrollee (or a subscriber of a network to which the enrollee belongs) is the same as the user of an access point (or a subscriber of a network to which the access point belongs), the MAC address of the enrollee and the MAC address of the access point can be mapped.

As in Table 1, an enrollee (or client device) having a MAC address of E:E:E and an access point having a MAC address of D:D:D can be mapped.

In the example of Table 1, the MAC address of one client (or enrollee) is mapped to the MAC address of one AP. However, a limitation may not be imposed thereto. A plurality of client MAC addresses may be mapped to one AP MAC address, or one client MAC address may be mapped to several AP MAC addresses.

In Step S902, the access point can generate and store a list (hereinafter, referred to as a connectable device list or a white list) of available enrollees that are connectable thereto on the basis of the information on the mapping relation acquired in Step S901.

In Step S903, the access point locates the identification information of the enrollee included in the probe request received from the enrollee. For example, it is possible to find the MAC address of the device that has transmitted a probe request by using a source address field of a MAC header of a probe request frame.

In Step S904, the access point determines whether or not the enrollee indicated by the identification information of the enrollee identified in Step S903 is included in the connectable device list stored in Step S902. When the enrollee that has transmitted the probe request is not included in the connectable device list (that is, NO in Step S904), the access point proceeds to Step S302 of FIG. 3. That is, the access point generates a UPnP event in response to the probe request and transmits the UPnP event to a registrar. Next, Step S303 and the subsequent steps of FIG. 3 are performed.

When the result of Step S904 is YES, the flow advances to Step S905 to determine whether the distance between the enrollee having transmitted the probe request and the access point having received the probe request is not greater than a predetermined threshold value. Here, the distance between the enrollee and the access point may be determined using an indicator (e.g., RSSI) indicating the strength of a signal (i.e., probe request) transmitted by the enrollee and received by the access point. For example, when the value of the RSSI is equal to or greater than the predetermined threshold, the distance between the enrollee and the access point is determined to be near. Conversely, when the value of the RSSI is less than the predetermined threshold, the distance is determined to be far.

When the result of Step S905 is NO, the operation of the access point proceeds to Steps of S302. That is, the access point generates a UPnP event for the received probe request and transmits the UPnP event to the registrar. Next, Step S303 and the subsequent steps of FIG. 3 are performed.

When the result of Step S905 is YES, the operation of the access point proceeds to Step S308. That is, the access point transmits the probe response including the PBC to the enrollee. Accordingly, EAP procedure of Step S309 can be immediately performed.

Figure 10:
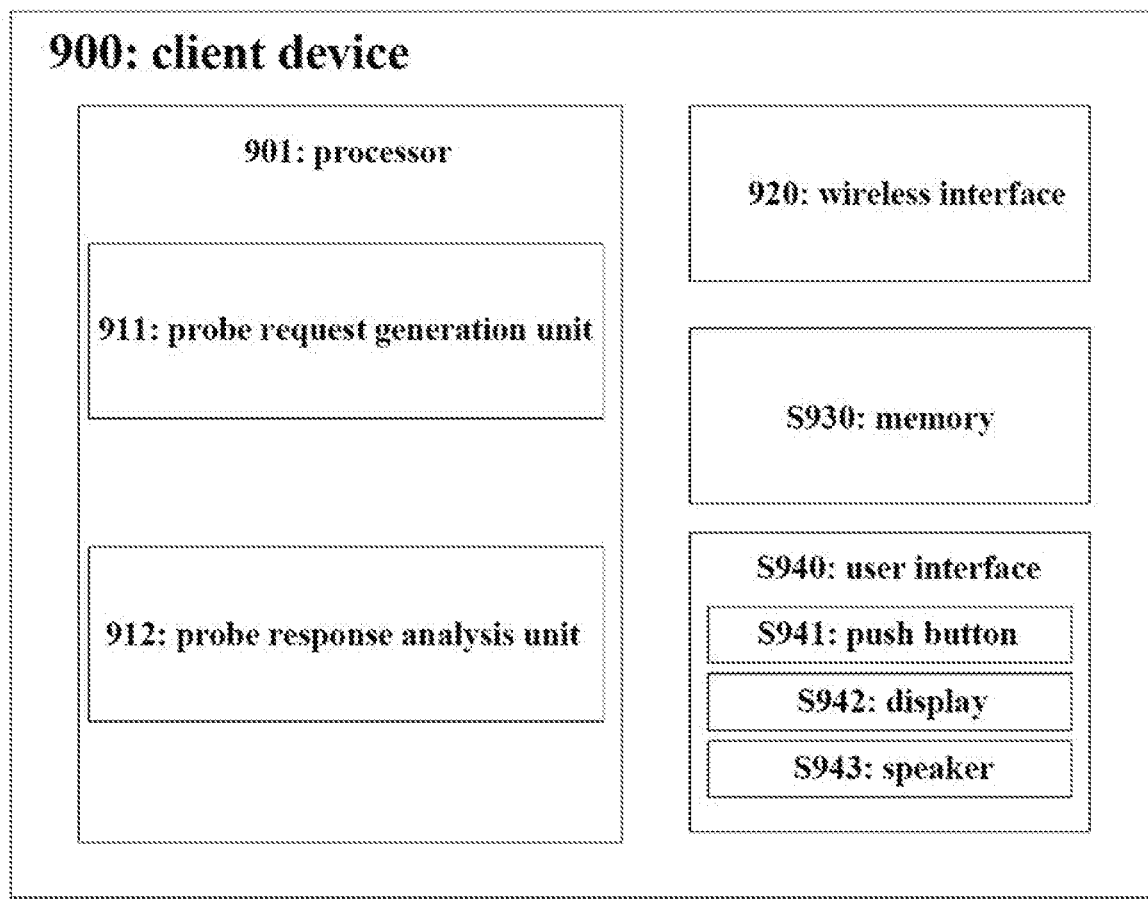
FIG. 10 is a schematic view illustrating the configuration of a client device according one embodiment of the present invention.
Figure 11:
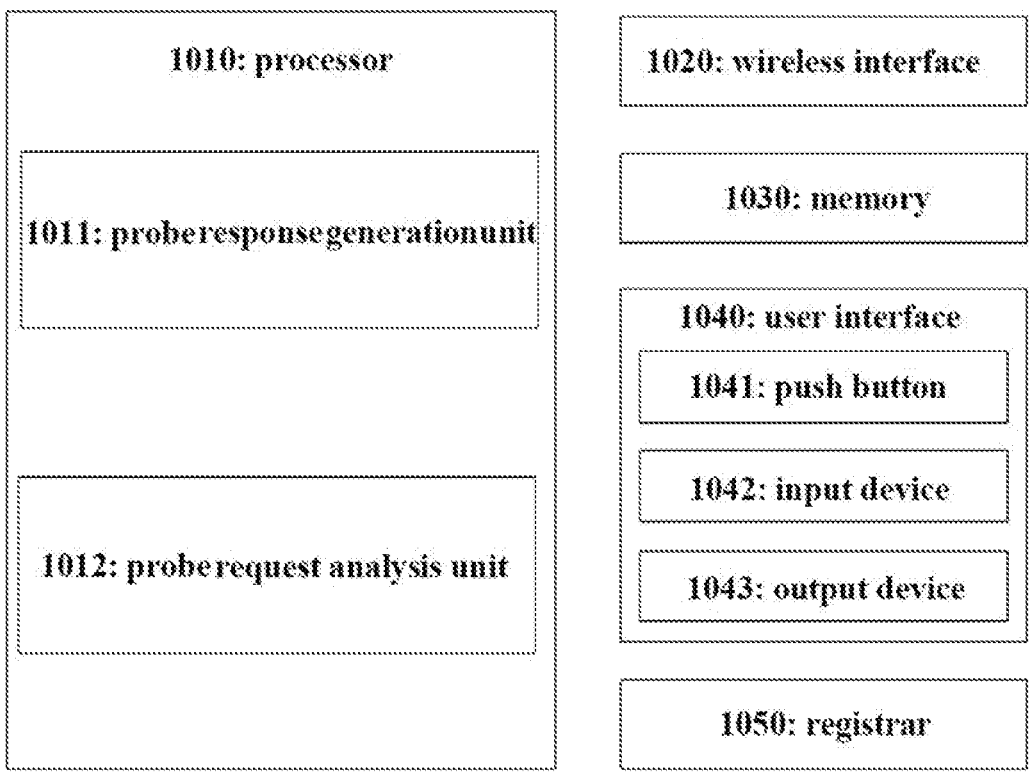
FIG. 11 is a schematic view illustrating the configuration of an access point according to one embodiment of the present invention.

FIG. 10 is diagram illustrating the configuration of a client device according to one embodiment of the present invention.

A client device 900 includes a processor 910, a wireless interface 920, a memory 930, a user interface 940, and the like.

The processor 910 controls the overall operation of the client device 900. The client device 900 includes a probe request generation unit 911 and a probe response analysis unit 912 as an external unit or an internal unit to perform a pairing method according to one embodiment of the present invention. The client device 900 can transmit and receive signals and/or data to and from the wireless interface 920, the memory 930, and the user interface 940. The processor 910 determines an operation to be performed next on the basis of signals and/or data received from the wireless interface 920, the memory 930, or the user interface 940. Based on the determination, the processor 910 transmits or receives signals and/or data to and from the wireless interface 920, the memory 930, or user the interface 940, thereby controlling the overall operation of the client device 900, including the wireless interface 920, the memory 930, and the user interface 940.

The wireless interface 920 enables data communication between the client device 900 and an external network such as a wireless local area network (WLAN) such that the client device 900 has the ability to perform wireless communication.

The memory 930 may store a program code to be executed by the processor 910 (e.g., a program code for executing the pairing method according to the present invention). The memory 930 also stores various information associated with the client device 900. For example, the memory 930 stores information such as PBC information of the client device 900, information on access points to which the client device 900 has already had access, and the like.

The user interface 940 receives user input operations or outputs information to be provided to the user. The user interface 940 includes a push button 941 which is a physical button or a virtual button. In addition, the user interface 940 may include a display 942 for outputting a video signal, a speaker 943 for outputting an audio signal, and the like when the client device 900 is a device servicing moving pictures.

Hereinafter, the operation of the components of the client device 900 will be described in connection with a pairing method according to one embodiment of the present invention.

The processor 910 controls the wireless interface 920 to scan the channel to identify a connectable access point. The processor 910 determines, on the basis of connection history information stored in the memory 930, whether the identified access point is an access point that is not known to the client device. In the case where the access point is an already known one, the probe request generation unit 911 generates a first type probe request and transmits the first type probe request to an external device (for example, access point) via the wireless interface 920. When the access point is one not known to the client device, the processor 910 further determines whether the identified access point is in an active PBC mode. When the identified access point is in the active PBC mode, the processor 910 generates a push button event of the client device, and the probe request generation unit 911 generates a second type probe request. The processor 910 sends the second type probe request to an external device via the wireless interface 920. When the identified access point is not in the active PBC mode, the processor 910 determines whether a push button event occurs at the user interface 940. When the push button event occurs at the user interface 940, the probe request generation unit 911 generates a probe request so as to perform the procedure of FIG. 3, starting from Step S301, and then transmits the probe request to the external device through the wireless interface 920. When no push button events have occurred at the user interface 940, the processor 910 controls the wireless interface 920 to re-scan the channel to identify accessible access points.

The probe response analysis unit 912 analyzes the probe response received via the wireless interface 920 and the processor 910 controls the operation of the client device 900 according to the analysis results. The probe response analysis unit 912 determines whether the received probe response does not include probe response type information, and also determines whether the probe response is a first type probe response or a second type probe response. When the probe response analysis unit 912 determines that the probe response does not include the probe response type information, the probe response analysis unit 912 further determine whether the probe response includes PBC information. When the probe response includes the PBC information, the processor 910 controls the operation of the client device 900 such that the client device 900 performs the extensible authentication protocol procedure in conjunction with the access point. When the PBC information is not included in the probe response, the probe request generation unit 911 generates a probe request to initiate the procedure of FIG. 3, starting from Step S306, and the processor 910 transmits the probe request to the external device via the wireless interface 920.

When the probe response analysis unit 912 determines that the received probe response is the first type probe response, the probe request generation unit 911 generates a first type probe request. Then, the processor 910 immediately transmits the first type probe request to the external device via the wireless interface 920.

When the probe response analysis unit 912 determines that the received probe response is the second type probe response, the probe request generation unit 911 generates a first type probe request. The processor 910 may transmit the first type probe request to the external device via the wireless interface 920 in a predetermined time. The processor 910 obtains information of the predetermined time from the second type probe response.

FIG. 10 is diagram illustrating the configuration of an access point 1000 according one embodiment of the present invention.

The access point 1000 includes a processor 1010, a wireless interface 1020, a memory 1030, a user interface 1040, and the like. A registrar 1050 may be an internal device provided within the access point 1000 or may be a separate device provided outside the access point 1000. Hereinafter, a case where the registrar 1050 is implemented inside the access point 1000 will be described. However, even when the registrar 1050 is provided outside the access point 1000, the same operation is performed in terms of data signal processing as the case where it is implemented inside the access point 1000.

The processor 1010 controls the overall operation of the access point 1000. The access point 1000 includes a probe request generation unit 1011 and a probe response analysis unit 1012 as an external unit or an internal unit to perform a pairing method according to one embodiment of the present invention. The access point 900 can transmit and receive signals and/or data to and from the wireless interface 1020, the memory 1030, the user interface 1050, and the registrar 1050. The processor 1010 determines an operation to be performed next on the basis of signals and/or data received from the wireless interface 1020, the memory 1030, the user interface 1040, or the registrar 1050. Based on the determination, the processor 910 transmits or receives signals and/or data to and from the wireless interface 1020, the memory 1030, the user the interface 1040, or the registrar 1050, thereby controlling the overall operation of the client device 1000, including the wireless interface 1020, the memory 1030, the user interface 1040, and the registrar 1050.

The wireless interface 1020 enables data communication between the access point and an external device (for example, client device) attempting to have access to a wireless LAN such that the access point 1000 has the ability to perform wireless communication with the external device.

The memory 1030 stores a program code to be executed by the processor 1010 (e.g., a program code for executing the pairing method according to the present invention). The memory 1030 also stores various information on the access point 1000. For example, the memory 1030 may store information on a selected registrar (e.g., PBC information) and the like.

The user interface 1040 receives user input operations or outputs information to be provided to the user. The user interface 1040 includes a push button 1041 which is a physical button or a virtual button. The user interface 1040 includes a keyboard, a keypad, or other buttons as an input device 1042 for receiving user input operations. The user interface 1040 may further include an output device 1043 such as a display, a lamp, or a speaker to provide the user with status information of the access point.

The registrar 1050 has the authority to accept and reject access to the network and has the ability to receive and process connection requests from external devices.

Hereinafter, the operation of the components of the access point 1000 will be described in connection with a pairing method according to one embodiment of the present invention.

When a probe request is received via the wireless interface 1020, the processor 1010 may transmit a UPnP event to the registrar 1050 in reply to the probe request. The probe request analysis unit 1012 analyzes the probe request to determine whether the probe request include probe request type information and whether the probe request is a first type probe request or a second type probe request. When the probe request received by the access point 1000 does not include the probe request type information, the probe response generation unit 1011 may generate a probe response to initiate the procedure of FIG. 3, starting from Step S303. The processor 1010 send the probe response via the wireless interface 1020 to an external device.

When the probe request received by the access point 1000 is the first type probe request, the processor 1010 checks the information on the selected registrar, which is stored in the memory 1030, and the probe response generation unit 1011 generates a probe response including the information on the selected registrar. The processor 1010 transmits the probe response via the wireless interface 1020 to an external device. Thereafter, the processor 1010 controls the operation of the access point 1000 such that the access point 1000 performs the extensible authentication protocol procedure in conjunction with the client device.

When the probe request received by the access point 1000 is the second type probe request, the processor 1010 generates a push button event of the registrar 1050 and transmits the push button event to the registrar 1050. At this time, the processor 1010 can control the monitor time of the registrar 1050. For example, by adjusting the monitor time to a value smaller than the default value, control is performed such that the probe request of a specific vendor is more promptly processed than other requests. The registrar 1050 transmits the selected registrar which is set to a value of True to the processor 1010 when it is possible to immediately transmit the PBC information. On the contrary, the registrar 1050 transmits the selected registrar which is set to a value of False to the processor 1010 when it is impossible to immediately transmit the PBC information. The registrar 1050 may insert information of the predetermined time Tw into the selected registrar which is set to a value of False, and the predetermined time may be set to a time that is required until the registrar 1050 can transmit the PBC information.

When the selected registrar received from the registrar 1050 has a value of True, the probe response generation unit 1011 generates the first type probe response. Then, the processor 1010 transmits the first type probe response to the external device via the wireless interface 1020.

When the selected registrar received from the registrar 1050 has a value of False, the probe response generation unit 1011 generates the second type probe response. The probe response generation unit 1011 may generate the second type probe information in which the information of the predetermined time Tw is included. The processor 1010 transmits the second type probe response to the external device via the wireless interface 1020.

After transmitting the first or second type probe response to the external device, the access point 1000 enters a standby state in which the access point 1000 waits for a probe request.

In addition, the memory 1030 of the access point according to the exemplary embodiment of the present invention may store information on mapping relation between identification information of the access point and identification information of the enrollee provided from the external server. The memory 1030 may also store a connectable device list (e.g., a white list) which is generated by the processor 1010 on the basis of information on the mapping.

In addition, the probe request analysis unit 1012 determines whether a client device which has transmitted the probe request is included in the connectable device list on the basis of the identification information of the client device 900. In addition, the probe request analysis unit 1012 determines whether the distance between the client device 900 which has transmitted the probe request and the access point 1000 is equal to or less than a predetermined threshold value The probe response generation unit 1011 generates a probe response, according to the operation of the access point described with reference to FIG. 9, on the basis of at least one of the probe request type information, the probe response type information, the identification information of the access point, the identification information of the client device, and the distance between the access point and the client device, and transits the probe response to the client device 900.

The operation of an access point, including the enrollee (i.e., client device) and the registrar, can be implemented by software, hardware, or by both.

The scope of the present invention includes software (or an operating system (OS), an application, a firmware, a program, etc.) for causing an operation according to various embodiments of the present invention to be executed on a device or a computer, and a computer-readable medium that stores the software so that the software can be executed on a computer.

While various embodiments of the present invention have been described with reference to a Wi-Fi system, the present invention can be applied to various mobile communication systems.

The invention claimed is:

1. A pairing method executed by a client device so as to be paired with an access point, the pairing method comprising:
   transmitting a first probe request including probe request type information to the access point;
   receiving a first probe response from the access point; and
   performing an authentication procedure in conjunction with the access point based on the first probe response,
   wherein when the probe request type information included in the first probe request has a first value, the first probe response is received as a probe response corresponding to the first probe request,
   wherein when the probe request type information included in the first probe request has a second value, the receiving of the first probe response further comprises:
      receiving a second probe response corresponding to the first probe request from the access point;
      transmitting a second probe request to the access point in response to the second probe response; and
      receiving the first probe response corresponding to the second probe request from the access point.

2. The pairing method of claim 1, wherein the first probe response includes PBC (Push Button Configuration) information of a registrar.

3. The pairing method of claim 1, wherein the client device generates a push button event of the client device when the probe request type information included in the first probe request has the second value.

4. The pairing method of claim 1, wherein the second probe response includes probe response type information.

5. The pairing method of claim 4, wherein when the probe response type information of the second probe response has the first value, the transmitting of the second probe request to the access point in response to the second probe response is performed upon receiving the second probe response.

6. The pairing method of claim 4, wherein when the probe response type information of the second probe response has the second value, the transmitting of the second probe request to the access point in response to the second probe response is performed in a predetermined time after the second probe response is received.

7. The pairing method of claim 6, wherein information of the predetermined time is included in the second probe response.

8. A pairing method executed by an access point so as to be paired with a client device, the pairing method comprising:

receiving a first probe request including probe request type information from the client device;

transmitting a first probe response to the client device; and performing an authentication procedure in conjunction with the client device, wherein when the probe request type information included in the first probe request has a first value, the first probe response is transmitted as a probe response corresponding to the first probe request, wherein when the probe request type information included in the first probe request has a second value, the transmitting of the first probe response further comprises:

receiving a second probe response corresponding to the first probe request from the access point;

transmitting a second probe request to the access point in response to the second probe response; and receiving the first probe response corresponding to the second probe request from the access point.

9. The pairing method of claim 8, wherein the first probe response includes PBC (Push Button Configuration) information of a registrar.

10. The pairing method of claim 8, wherein when the probe request type information included in the first probe request has the second value, the access point generates a push button event of a registrar.

11. The pairing method of claim 8, wherein the second probe response includes probe response type information.

12. The pairing method of claim 11, wherein the probe response type information is determined based on availability of a selected registrar.

13. The pairing method of claim 12, wherein when the selected registrar is not available, the second probe response includes information of a predetermined time that is determined based on a time required for the selected registrar to become available.

14. The pairing method of claim 8, wherein when the probe request type information included in the first probe request has a second value, the access point sets a monitor time of the registrar to be a predetermined time or shorter.

15. The pairing method of claim 8, further comprising:

obtaining information on a mapping relationship between identification information of one or more client devices and identification information of the access point, from a server, wherein the first probe response is generated based on a determination of whether or not the client device transmitting the first probe request is included in a connectable device list generated based on the information on the mapping relationship.

16. A client device performing pairing with an access point, the client device comprising:

a processor; and a wireless interface, wherein the processor is configured to:

transmit a first probe request including probe request type information to the access point via the wireless interface, receive a first probe response from the access point, and perform an authentication procedure in conjunction with the access point on the basis of the first probe response, wherein when the probe request type information included in the first probe request has a first value, the first probe response is received as a probe response corresponding to the first probe request, wherein when the probe request type information included in the first probe request has a second value, the processor is further configured to:

receive a second probe response corresponding to the first probe request from the access point, transmit a second probe request to the access point in response to the second probe response; and receive the first probe response corresponding to the second probe request from the access point.

* * * * *